Patented Jan. 13, 1948

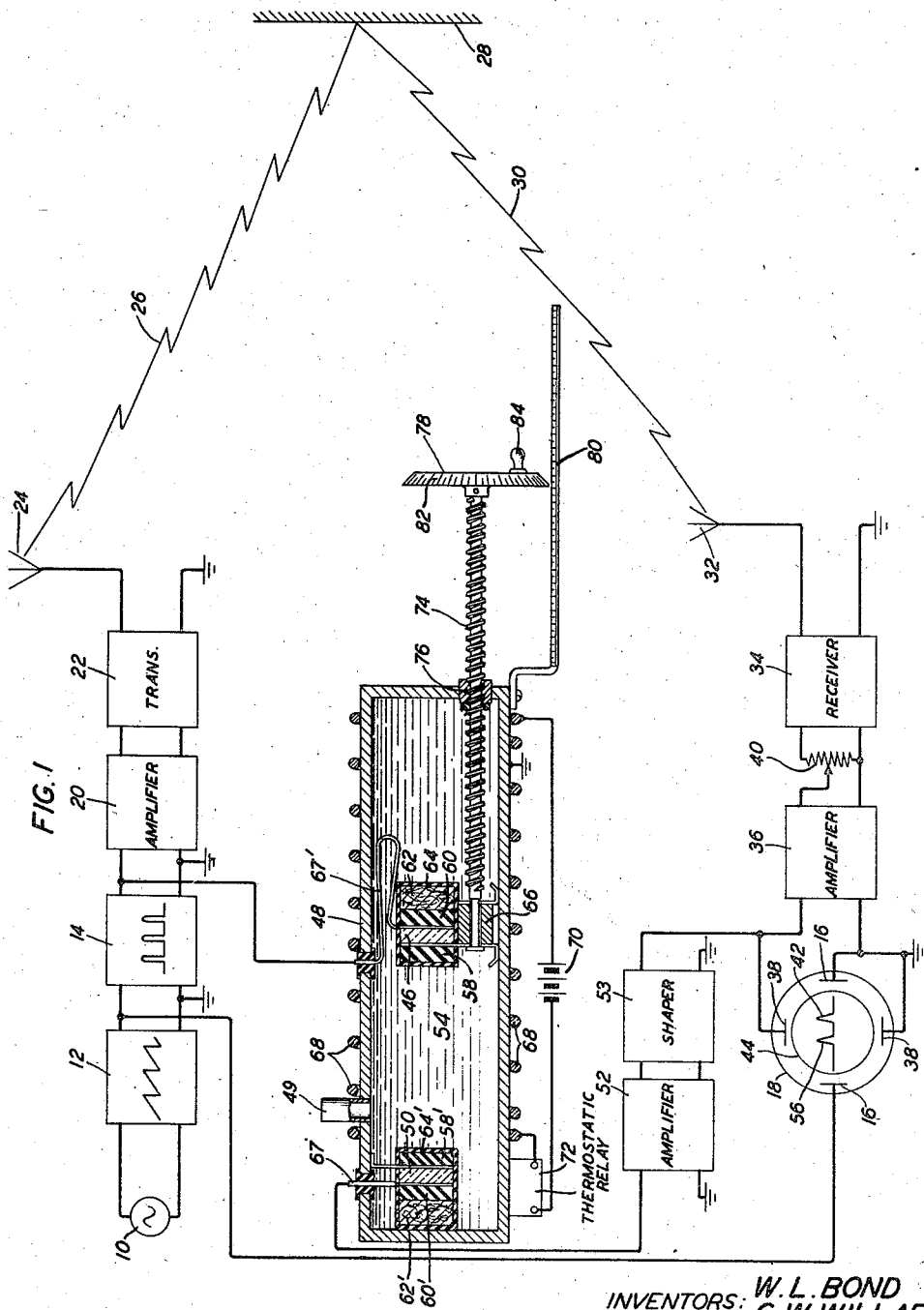

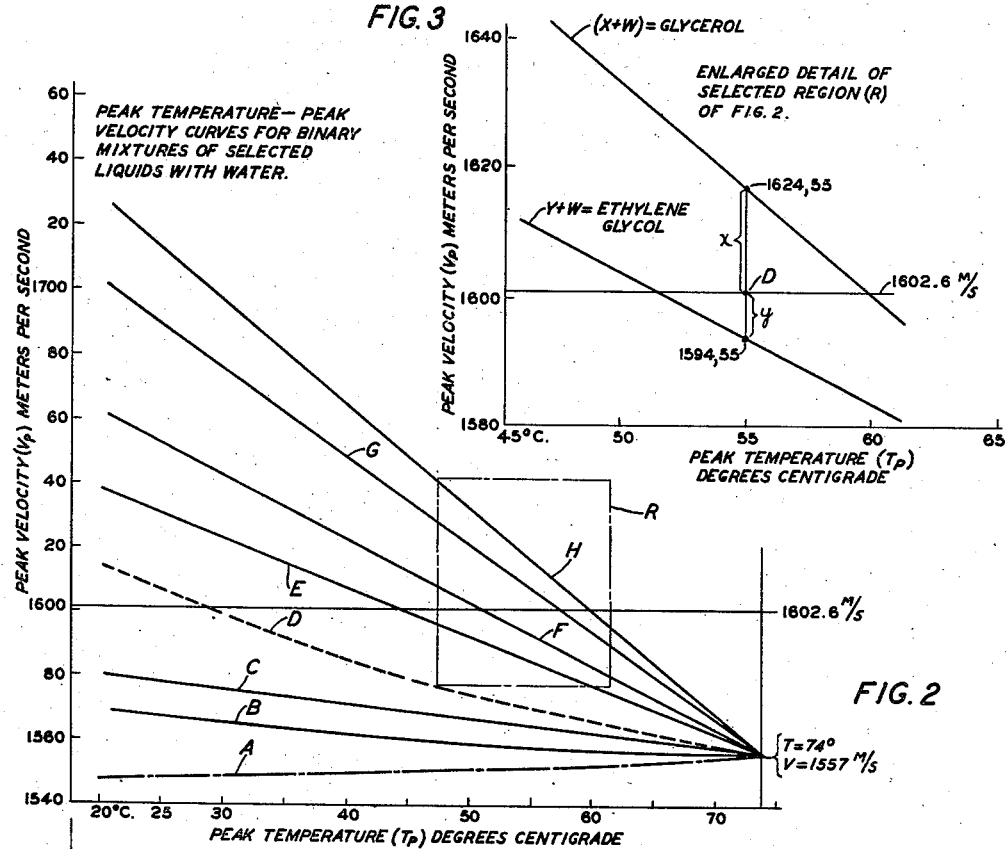
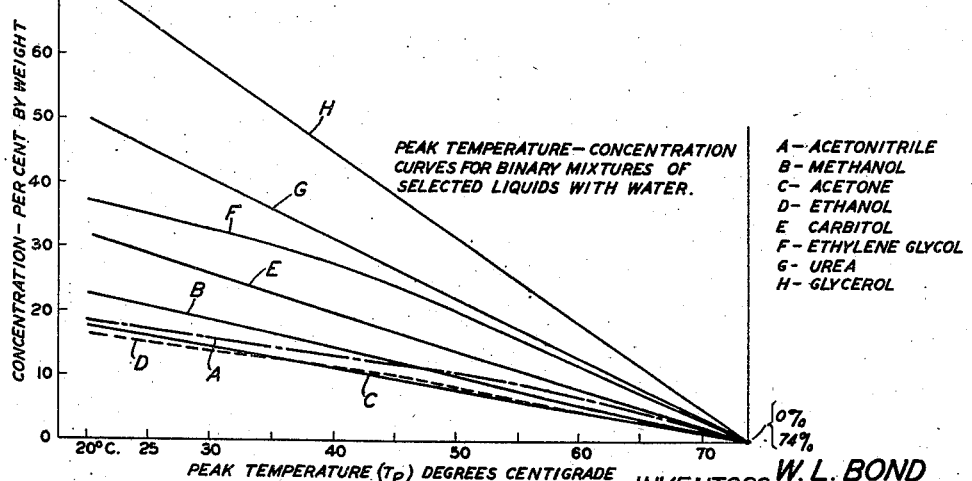

2,434,255

UNITED STATES PATENT OFFICE 2,434,255

TEMPERATURE COMPENSATED WAVE PROPAGATION DEVICE

Walter L. Bond, Brooklyn, N. Y., and Gerald W. Willard, Fanwood, N. J., assignors to Bell Telephone Laboratories, Incorporated, New York, N. Y., a corporation of New York Application May 7, 1943, Serial No. 486,006

12 Claims. (Cl. 178—44)

This invention relates to wave propagation devices and particularly to sonic devices in which an elastic wave is propagated from one point to another thereof, for example, a compressional wave of ultrasonic frequency.

A principal object of the invention is to provide a wave propagation device having a definite and predetermined propagation velocity at a definite predetermined temperature and a zero temperature coefficient of propagation velocity at that temperature.

A related object is to provide an improved variable delay device having a zero temperature coefficient.

Another object is to provide an improved variable time delay device, for example a device suitable for use as the measuring element in a system for the location of objects by the echo method, in which the time delay is rationally related to a convenient unit of distance measure so that the delay-altering means may be directly calibrated in such units.

Another object is to provide a liquid medium for use in a wave propagation device whose physical constants may readily be altered by the operator to suit the exigencies of various conditions.

Still another object is to provide a liquid for use in a wave propagation device whose characteristic impedance may be adjusted at will, for example, to match the impedance of an electromechanical driving or receiving element.

In the application of W. L. Bond and W. P. Mason, Serial No. 407,456, filed August 19, 1941, which issued as Patent No. 2,427,348, Sept. 16, 1947, there is described a variable time delay device comprising a liquid-tight container or tank substantially filled with a liquid wave propagation medium, means including a piezoelectric crystal for projecting a wave into this medium, means including a second piezoelectric crystal for recovering the wave energy, and means for matching the crystal impedances to the characteristic impedance of the liquid medium. A number of different liquids and liquid mixtures are described, their characteristic impedances being given. It is pointed out in that application that the characteristic impedance of a three-component liquid mixture may be altered while still maintaining either a zero temperature coefficient or a preassigned temperature by variation in the proportions of the various components. This, of course, is of assistance in making final adjustments of the impedance match between the piezoelectric driving and receiving devices and the liquid. An impedance change as great as fifteen per cent can be thus effected.

In the application of W. Shockley and G. W. Willard, Serial No. 439,396, filed April 17, 1942, and maturing into Patent No. 2,407,294, granted September 10, 1946, there are described a number of improved two-component liquid mixtures for use in a variable delay device. A feature which is common to the liquid mixtures described in that application is that a zero temperature coefficient of wave propagation velocity may be obtained at a definite preassigned temperature or at a definite preassigned velocity. The velocity and the temperature at which this zero temperature coefficient occurs are designated peak velocity and peak temperature, respectively. When a variable delay device of the type described is to be employed in the timing of some other phenomenon, for example the time of travel of a radiated wave to a reflecting object and, after reflection, back to its point of origin, it is obviously desirable that the time of travel of the compressional wave in the delay device liquid be variable over wide limits and measurable with great precision. To this end, one of the piezoelectric crystals or other driving and energy recovery means may be mounted for movement toward or away from the other as by a lead screw, the pitch of the lead screw being so correlated with the velocity of propagation of the compressional waves through the liquid that each turn of the lead screw or of a countershaft geared thereto shall correspond as exactly as possible to some integral multiple of ten units of distance measure, for example, one hundred yards, one thousand feet, etc. In order that these relations shall hold, it has been found that a special lead screw of non-standard pitch must be employed and, in addition, that the latter must be geared to a countershaft with a gear ratio differing from unity since it has proved difficult to obtain or to construct a lead screw whose pitch stands in such a relation with the propagation velocity of any known two-component mixture as to give a zero temperature coefficient of propagation velocity at a specific desired temperature.

In accordance with the present invention these shortcomings of the apparatus described in the aforementioned patent of W. Shockley and G. W. Willard, are obviated by the provision of a variable delay device comprising a liquid mixture of three components or more, one of said components having a temperature coefficient of wave propagation velocity of one sign and the others of said components having temperature coefficients of wave propagation velocity of opposite sign, the components being present in the mixture in such proportions as to give a substantially zero temperature coefficient of wave propagation velocity at a preassigned convenient operating temperature and at a preassigned convenient propagation velocity. In particular, the latter may be selected so as to bear a simple relation to the pitch of a simple standard lead screw so that the latter may be directly calibrated in convenient desired units of distance. For convenience in design and computation, any of the three-component liquid mixtures of the invention may be treated rather as a binary mixture of two different two-component mixtures, one of which has a peak temperature or peak velocity or both which is higher than the preassigned desired value and the other of which has a peak temperature or peak velocity or both which is lower than the preassigned desired value. Viewing the three-component mixture in this light leads to a simple and effective method of adjusting the proportions of the components in such a way as to result in desired physical constants, for example, peak temperature and peak velocity, or peak velocity and characteristic impedance, for the liquid mixture as a whole.

The invention will be fully understood from the following description of an illustrative embodiment thereof, taken in conjunction with the appended drawings, in which:

Fig. 1 shows apparatus for the direct measurement of distance, simplified by the use of the novel ternary liquid mixtures;

Fig. 2 is a group of curves showing the characteristics of a number of different binary liquid mixtures; and Fig. 3 is a portion of Fig. 2, to an enlarged scale, illustrating the process by which the proportions of a novel ternary mixture may be pre-designed.

Referring now to the figures, any suitable means may be provided for generating electromagnetic energy, for example in the form of a sequence of sharp pulses, transmitting these pulses in the direction of an object to be located, receiving the reflected pulses, amplifying the received pulses, and comparing the instant of reception with the instant of transmission as delayed by the apparatus of the invention. Thus, purely by way of example, a generator 10 of alternating current energy of the order, for example, of 1,000 cycles per second, feeds a saw-tooth-shaping circuit 12, which in turn feeds a pulse-shaping circuit 14. The output terminals of the saw-tooth-shaping circuit 12 may be connected to the horizontal deflecting elements 16 of a cathode ray oscilloscope 18 to provide a time base therefor. The output energy of the pulsing circuit 14 may be fed through a suitable amplifier 20 to radio transmitter apparatus 22 controlled thereby whence pulses of high frequency electromagnetic energy are transmitted to an antenna 24 and radiated through space, as indicated at 26, toward an object 28, and reflected thereby, as indicated at 30 to a receiving antenna 32. Current induced in the receiving antenna 32 may be converted to pulse form in any suitable manner as by a receiver 34, the output of which, after amplification by an amplifier 36, may be applied to the vertical deflecting elements 38 of the oscilloscope 18. Since, in general, the amplitude of the output current of the receiver 34 depends on the distance of the reflecting object, means are preferably provided for compensating for this variation, as for example, a potentiometer 40 in the output circuit of the receiver 34. In addition, automatic gain-adjusting means of any suitable type, are preferably included in the receiver itself.

With the system as thus far described, an indication 42 appears on the screen 44 of the oscilloscope 18, and the displacement of the indication 42 along the horizontal scale, depends on the time elapsing between the instant of radiation and the instant of reception of the pulse.

A portion of the energy of the pulses at the output terminals of the pulsing circuit 14 is applied to the terminals of a suitable piezoelectric crystal 46 mounted within a liquid-tight container 48, which may be provided with an expansion tank 49. This driving crystal may be movably mounted for movement axially of the container. A second piezoelectric crystal 50 may be mounted within and close to one end of the container in any convenient manner, and its output energy may be supplied by way of an amplifier 52 and a shaper 53 to the vertical deflecting elements 38 of the oscilloscope 18. The shaper 53 which may be of any suitable type, serves merely to improve the wave form of the crystal output for visual examination on the oscilloscope screen. It is of advantage but by no means essential.

Evidently the roles of the fixed crystal and the movable crystal may be interchanged, energy being delivered to the fixed crystal from the shaper 14 and withdrawn from the movable crystal. The arrangement shown, however, offers certain advantages inasmuch as minor distortions that may arise from crystal movements are restricted to the driving circuit and excluded from the receiving and indicating circuit.

When a suitable liquid 54 is placed in this container 48, substantially filling the region between the driving crystal and the output crystal, then expansions and contractions of the driving crystal in response to the pulsing signals applied thereto give rise to compressions and rarefactions of the liquid in contact therewith. These compressions and rarefactions produce compressional waves which travel through the liquid column from the driving crystal to the receiving crystal where they exert forces upon the latter which may be translated into electrical impulses in accordance with known principles. As these electrical impulses are applied to the vertical deflecting elements 38 of the oscilloscope there will appear on the oscilloscope screen 44 a second indication 56 whose position along the horizontal scale is a measure of the time elapsing between the instant at which a particular compression wave pulse commences its travel through the liquid and the instant at which it reaches the receiving crystal.

In order that the driving crystal 46 shall respond freely and rapidly to the incidence of an electric signal of desired wave form, for example, a sharp pulse, it is preferred that the ratio of its reactance to its resistance (each as modified by its environment) shall be low. In electrical terminology, the impedance of the crystal should be matched with that of the liquid column. For a full description of means and methods by which this impedance match may be effected, reference may be made to the application of W. L. Bond and W. P. Mason, Serial No. 407,456, filed August 19, 1941. In brief, it is the teaching of that application that the crystal 46, its faces already provided with suitable electrodes in well-known manner, may be embedded between blocks of plastic material whose constitutions and dimensions are selected with the impedance match in mind. For example, if a Rochelle salt crystal be employed, the front block 58 may be of methyl methacrylate, its thickness being preferably one quarter wave-length at the frequency of the principal component of the waves to be transmitted through the liquid. This serves to match the impedance of the crystal with that of the liquid column 54, if the latter be a liquid mixture whose impedance does not greatly differ from that of water. The rear block 60 may be similar or of different constitution as the case may require, it being borne in mind that its function is to match the rear face impedance of the crystal to an absorber, for example, a mass of felt 62.

In cases where it is desirable to exclude the liquid 54 from direct contact with the crystal 46 and associated impedance-corrective members, for example, when a Rochelle salt crystal soluble in the liquid 54 is employed, a thin membrane 64 of rubber or the like may form a liquid-tight envelope around the crystal assembly without appreciably damping its action. The effect of such membrane in modifying impedance values if appreciable, may be taken into account in the overall design of the assembly.

The same considerations apply to the receiving crystal assembly, to the end that a compression wave pulse incident thereon from the liquid column may produce an electrical pulse in the output circuit without distortion. The crystal 50 may, therefore, be embedded between blocks 58', 60' of plastic material, backed by a mass of felt 62', and surrounded by a rubber membrane 64'.

The receiving crystal assembly may be mounted in any convenient manner as by bolts, not shown, at one end of the container 48 and the driving crystal assembly may be mounted on a bracket 66 arranged for travel lengthwise of the container.

One face of each crystal may be electrically grounded to the container wall, and impulse electromotive forces may be applied between the faces of the driving crystal and withdrawn from between the faces of the receiving crystal by way of suitable conductors, for example, flexible coaxial lines. Inasmuch as the liquid column may not be an insulator, a single wire surrounded by a rubber tube such as 67, and 67' will act as a coaxial line, the liquid in contact with the tube, together with the metal parts of the container 48, serving as the outer conductor.

In order to prevent excessive temperature variations from reducing the precision of the apparatus, it is preferred to maintain the container 48 within a restricted temperature range. To this end a heating coil 68 may be wound about the container 48, and supplied with current from a suitable source 70 through a relay controlled by a suitable thermostatic device 72. The container and its heating equipment may then be embedded in some heat-insulating and cushioning material such as felt, not shown.

When the pulses derived from the pulsing circuit 14 are transmitted over both paths, i. e., the path of radiant energy to the object and back and the path through the wave supporting fluid column 54, two indications 42, 56 in general appear on the oscilloscope screen 44, the distance of each impulse along the horizontal scale being a measure of the total elapsed time between the instant at which the pulse originates and the instant at which it reaches the oscilloscope.

The movable piezoelectric crystal 46, which in the figure is the driving crystal but may equally well be the receiving crystal, is mounted within the container 48 for movement toward or away from the stationary crystal. For example, it may be mounted on a bracket 66 which is arranged to slide on the floor of the container 48, being guided and maintained in proper orientation, i. e., squarely facing the receiving crystal 50, in any suitable manner. It may be coupled to a lead screw 74 in the manner shown, which lead screw protrudes through a liquid-tight threaded bushing 76 to the exterior of the container, the outer end of the lead screw being provided with a head or a disc 78 of large diameter, so that by turning the disc as by a knob or handle 84, the longitudinal position of the movable crystal 46 may be adjusted over a wide range. A rod 80 is fixed to the container 48 and extends away from it in an axial direction. This rod 80 may be calibrated with divisions spaced apart by the pitch distance separating successive adjacent threads of the lead screw. The disc 78 carries a peripheral scale 82 and its diameter is selected so as to bring this scale into close juxtaposition with the rod 80. A micrometer arrangement of any of the types well known to the art may be employed to afford precise adjustment, if desired.

In operation, an attendant may rotate the disc 78 in one direction or the other to increase or reduce the spacing between the fixed crystal and the movable crystal. This increases or reduces the time of travel for pulses over the liquid medium path and therefor moves the second oscilloscope screen indication 56 toward or away from the first one 42. It will be understood that when by rotation of the disc 78 the two indications 42, 56 are brought into coincidence on the oscilloscope screen 44, the times of travel of the pulse over both paths are alike. When the medium within the delay cell is selected in accordance with the principles of the invention to correspond with the pitch of the lead screw 74, for example, when the liquid is such as to have a propagation velocity of 1752.6 yards per second (1602.6 meters per second) and the lead screw a pitch of 26 threads to the inch, then each turn of the disc 78 corresponds exactly to an object distance of 100 yards and a tenth of a turn corresponds to an object distance of 10 yards, so that the divisions of the rod and on the scale on the periphery of the disc indicates the object distance in yards directly.

As a result of extensive laboratory tests, it has been found that, with the sole exception of water, none of the multitude of single liquid substances tested exhibits a zero temperature coefficient of propagation velocity at any temperature within the range likely to be encountered in practice, i. e., temperatures of the order of 0° to 100° C. The sole exception, water, has a zero temperature coefficient at the temperature of 74° C. The use of water alone at this high temperature is objectionable for many reasons. Its vapor pressure is high so that evaporation becomes a problem. A considerable load is placed on the associated heating equipment 68, 70. The propagation velocity for compressional waves in water at this temperature is 1,557 meters per second, and it is difficult, if not impossible, to construct a suitable lead screw with commercially available screw-cutting equipment which shall cooperate with this particular velocity in order to permit the use of direct reading dials. Certainly, such a lead screw is impossible to obtain in the commercial market.

Throughout the temperature range likely to be encountered in practice, it has been found that each of a large number of liquid substances is characterized by a negative temperature coefficient, while the temperature coefficient of water in the same range is positive. This opens up the possibility that a properly selected mixture of water with some other liquid may have a zero temperature coefficient at some temperature within this range and for an exactly specified propagation velocity.

Tests have shown this surmise to be correct, and the aforementioned patent of W. Shockley and G. W. Willard is in part directed to various binary liquid mixtures with which these possibilities may be realized. However, it has been found that in order to take full advantage of the properties of such binary mixtures, i. e., to obtain a zero temperature coefficient at a temperature within the desired working range, lead screw and gearing arrangements must be provided which are of considerable complexity. For example, if attention be restricted to the specific temperature 55° C. (135° F.), the binary mixtures having peak velocities at this temperature are:

|  | $V_p$, Meters/Sec. | $V_p$, Yards/Sec. | Threads per Inch |
|---|---|---|---|
| Glycerol | 1,625 | 1,775 | 25.5+ |
| Urea | 1,608 | 1,758 | 25.9+ |
| Ethylene glycol | 1,595 | 1,743 | 26.1+ |
| Carbitol | 1,584 | 1,731 | 26.3 |
| Ethanol | 1,570 | 1,716 | 26.5+ |
| Acetone | 1,565 | 1,711 | 26.6+ |
| Methanol | 1,557 | 1,704 | 26.8 |

Now, none of these velocities are such as to permit use of a standard pitch lead screw without ratio transforming gearing as may be seen from the column "threads per inch" which gives the required lead screw pitch. 26 threads per inch corresponds to a standard lead screw but that value does not correspond with any of the substances noted. In order to use a standard 26 thread per inch lead screw it would be necessary to design a gear train to convert one of the values of threads per inch given in the table to 26 or to some other standard pitch as, for example, 20, 22, 24, 27, 28, 30, 32, etc. This would require gearing very difficult to obtain.

With the ternary mixtures of the invention, a small change in propagation velocity may be obtained which permits the use of a lead screw of simple, standard pitch and entirely dispenses with the associated gear train, and this without in any way departing from the condition that the temperature coefficient of propagation velocity shall be zero at this velocity and that the peak temperature shall lie within a convenient working range. A suitable peak velocity, for example, is 1602.6 meters per second (1752.6 yards per second) with which a lead screw having a pitch of 26 threads per inch may be employed. Such a lead screw may be constructed on any standard lathe.

It may easily be shown that if the dial 82 is to indicate the distance of the reflecting object 28 in yards, directly and correctly, the propagation velocity V of the liquid must satisfy the relation $$\frac{\Delta N}{\Delta X} = \left(\frac{2V}{C}\right)FT$$

where

V is the propagation velocity in the liquid in any convenient units of velocity measure;

C is the propagation velocity of electromagnetic waves in free space in the same units of velocity measure;

ΔX is the change in object distance in suitable units;

ΔN is the number of turns or fractions of a turn of the calibrated disc 78 which are to correspond to the object distance change ΔX;

T is the pitch of the lead screw 74 in threads per inch; and

F is a conversion factor relating the thread pitch units to the distance units. For example, with X in yards and T in threads per inch, the factor F has the value 36. Thus with a desired ratio of one full turn of the disc 78 per hundred yards change in the object distance, and with a selected value of 26 threads per inch for the pitch factor T, $$\frac{\Delta N}{\Delta X} = \frac{1}{100} = \left(\frac{2V}{C}\right)36 \times 26$$

from which

V=1602.6 meters per second

Likewise, for a pitch of T=27,

V=1,543 meters per second and for a pitch of T=24,

V=1,736 meters per second

T=25 is not a standard pitch, while pitches less than 24 T. P. I. (turns per inch) and greater than 27 T. P. I. require liquid propagation velocities which are outside of the range of obtainable values.

In Fig. 2 there are shown the peak velocity-peak temperature curves and the concentration peak temperature curves for a number of different binary liquid mixtures of the substances named with water. Each of these binary mixtures is suitable for use in a delay cell, but use of any one by itself restricts the apparatus either to certain few possible peak temperatures or to certain few possible peak velocities. It is impossible, for example, using a single binary mixture, to obtain a peak velocity of 1.602 meters per second at a peak temperature of 55° C.

The manner in which the relative proportions of the components of a ternary mixture which meets specified peak velocity and peak temperature requirements will now be explained in connection with Fig. 3 which shows portions of the peak velocity-peak temperature curves for ethylene glycol-water mixtures and for glycerol-water mixtures, respectively, to an enlarged scale. These liquids are selected by way of example only, other selections being possible. Therefore, in Fig. 3, to indicate its generality, the curves have been labelled "X+W" and "Y+W" respectively.

Suppose that it is desired to concoct a mixture having a desired peak velocity $V_D$ of 1602.6 meters per second and a desired peak temperature $T_D$ of 55° C. It will be observed that these properties are represented by point "D" in the velocity temperature plane and that this point does not lie either on the X+W curve or on the Y+W curve.

A construction line may be drawn through the point "D" to intersect the X+W curve and the Y+W curve, as shown. In general, the line may lie in any direction whatever. The comparative distances from the point "D" to the X+W curve and to the Y+W curve, measured along this construction line, are now noted. Suppose that these two portions of the construction line are in the ratio $x$ to $y$. A three-component liquid Z is now made up by mixing "$x$" parts of liquid $Y+W$ and "$y$" parts of the liquid $X+W$ and the resulting three-component liquid should have a curve which passes through the point D.

For example, at 55° C., the peak velocity for glycerol is 1,624 meters per second while the peak velocity for ethylene glycol is 1,594 meters per second. Therefore the distances $x$ and $y$ are $a=22$ meters per second, $b=8$ meters per second. Furthermore, at 55° C., thence peak velocities occur at concentrations of 25 per cent and 16.8 per cent, for the glycerol-water mixture and the ethylene-glycol-water mixture, respectively. This calls for a mixture of 22 parts of the binary water-glycol mixture to 8 parts of the binary water-glycerol mixture, resulting in a ternary mixture in the proportions $$\frac{22}{30}$$

(83.2 per cent water+16.8 per cent ethylene glycol) +

$$\frac{8}{30}$$

(75 per cent water+25 per cent glycerol) or 0.8102 water+0.1230 ethylene glycol+0.0668 glycerol.

Suppose now that this mixture is tested and is found to have a peak velocity and temperature $V_z=1,604$ meters per second and $T_z=56.5°$. These values are too high by 1.4 meters per second and 1.5° C. respectively. The discrepancies may be due, for example, to impurities in the ingredients, to inaccurate measurements, or the like. Therefore, if a new mixture is calculated to have a correspondingly too low peak velocity and temperature the respective differences between the three components of the mixture and the three components of the original mixture are a measure of the necessary small additions required to bring the original mixture to the correct proportions to give the desired results.

In general, a change either in the propagation velocity of a liquid or in its density results in a change in its characteristic impedance since this quantity is proportional to to the product of density and propagation velocity. In certain applications the realization of a preassigned value of the characteristic impedance may be of more importance than either a particular peak temperature or a particular peak velocity. This might well be of importance in light valve or filter applications, for example, in which case the realization of a specified value of the propagation velocity is of comparatively small importance, while, to reduce to a minimum all reflections from the various surfaces of driving and receiving crystals, the most perfect impedance match possible is to be sought for. Inasmuch as crystal impedances are not continuously variable, one way of securing the most perfect match is to vary the impedance of the liquid medium to match that of the crystal.

The flexible character of the ternary mixtures of the invention is well suited to the accomplishment of this result, inasmuch as it permits the preselection and realization of desired impedance values with exactness at the same time as a desired value of either peak velocity or peak temperature, though not of both. However, by extending the principles of the invention to mixtures of more than three components, two or more ternary mixtures may be combined to give a quaternary mixture in which case three of its properties may be preassigned. In general, a mixture of $n+1$ different components may be concocted which shall have, within certain limits, preassigned values of $n$ different properties, where $n$ is any number.

Other examples of ternary mixtures which may be prepared in accordance with the principles hereinabove outlined, together with their peak velocities and peak temperatures are as follows:

| Substance and Proportions, Per Cent | Peak Velocity (M. P. S.) | Peak Temperature, °C. |
|---|---|---|
| 83.5% water, 14.8% urea, 1.65% ethylene glycol | 1,602.6 | 55 |
| 79.15% water, 18.4% ethylene glycol, 13.85% methanol | 1,602.6 | 40 |

It is to be borne in mind that in order to take full advantage of the zero temperature coefficient of the mixtures of the invention, the mixtures should be maintained at or near the temperature at which the coefficient obtains. For use outdoors this usually entails a heater element and thermostatic control means such as those shown in Fig. 1. For use indoors, for example in a laboratory in which the ambient temperature is maintained for example between 65° F. and 75° F., such means may be dispensed with, reliance being placed on the heating equipment of the building which houses the apparatus to supply this means.

Though described in terms of its embodiment in an ultrasonic compression wave device, the invention is not limited thereto, the principles of the invention being equally applicable to devices for the propagation of waves of widely different types and at widely different frequencies.

What is claimed is:

1. A wave propagation device which comprises a fluid mixture of at least three components, one of said components having a temperature coefficient of propagation velocity which is of one sign over a specified range of temperatures and velocities and the others of said components having temperature coefficients of propagation velocity of opposite sign over said range, said components being present in said mixture in such proportions as to give a substantially zero temperature coefficient of wave propagation velocity at a preassigned temperature and at a preassigned propagation velocity.

2. The method of adjusting the relative proportions of the three components of a ternary liquid mixture to have a zero temperature coefficient of wave propagation velocity at a preassigned temperature and at a preassigned velocity which comprises the following steps: determining the relation between peak velocity and peak temperature for various concentrations of a first binary mixture, said first binary mixture having a peak velocity greater than said preassigned peak velocity at said preassigned temperature, determining the relation between peak velocity and peak temperature for various concentrations of a second binary mixture, said second binary mixture having a peak velocity less than said desired preassigned peak velocity at said preassigned temperature, noting the concentration at which each of said binary mixture peak velocities occurs, observing the difference between each of said binary mixture peak velocities and said desired preassigned peak velocity, and mixing each of said binary mixtures together in inverse ratio to said peak velocity differences to form a ternary mixture.

3. A wave propagation device which comprises a fluid mixture of at least three components, one of said components having a temperature coefficient of wave propagation velocity of one sign and the others of said components having a temperature coefficient of wave propagation velocity of opposite sign, said components being present in said mixture in such proportions as to give a substantially zero temperature coefficient of wave propagation velocity and a desired preassigned value of characteristic mechanical impedance.

4. A wave propagation device which comprises an enclosed fluid mixture of at least two binary components, one of said binary components having a zero temperature coefficient of wave propagation velocity at a peak velocity less than a certain stipulated velocity and at a stipulated temperature, another of said binary components having a zero temperature coefficient of wave propagation velocity at a peak velocity greater than said stipulated velocity and at said stipulated temperature, said components being present in said mixture in such proportions as to give a substantially zero temperature coefficient of propagation velocity at said stipulated velocity and temperature.

5. A delay device which comprises an enclosed fluid mixture of water, ethylene glycol and glycerol, the proportions in which said substances are present in said mixture being such as to give a wave propagation velocity for said mixture of 1602.6 meters per second at a stipulated temperature and a zero temperature coefficient of propagation velocity at said velocity and at said temperature.

6. A wave propagating device which comprises a container, a fluid mixture of at least three components within said container, means in one part of said container for projecting an elastic wave into said fluid, means in another part of said container for receiving said elastic wave and means including a lead screw of standard pitch for varying the separation between said projecting means and said receiving means, said components being present in said mixture in such proportions that the elastic wave propagation velocity of said fluid is so correlated to the pitch of said lead screw that each full turn of said screw corresponds to a predetermined distance of propagation of the elastic wave in said fluid.

7. A wave propagating device which comprises a container, a fluid mixture of at least three components within said container, means in one part of said container for projecting an elastic wave into said fluid, means in another part of said container for receiving said elastic wave and means including a lead screw of standard pitch for varying the separation between said projecting means and said receiving means, said mixture having a substantially zero temperature coefficient of propagation velocity and a propagation velocity so correlated to the pitch of said lead screw that each full turn of said screw corresponds to a predetermined distance of propagation of the elastic wave in said fluid.

8. A delay device which comprises an enclosed fluid mixture of water, ethylene glycol and methanol, the proportions in which said substances are present in said mixture being such as to give a wave propagation velocity for said mixture of 1602.6 meters per second at a stipulated temperature and a zero temperature coefficient of propagation velocity at said velocity and at said temperature.

9. A delay device which comprises an enclosed fluid mixture of water, ethylene glycol and urea, the proportions in which said substances are present in said mixture being such as to give a wave propagation velocity for said mixture of 1602.6 meters per second at a stipulated temperature and a zero temperature coefficient of propagation velocity at said velocity and at said temperature.

10. A temperature-compensated wave delay device which comprises a container, a fluid mixture of at least three components including water, a glycol and urea within said container, said components, being present in said mixture in such proportions as to give a substantially zero temperature coefficient of wave propagation velocity at a preassigned temperature and at a preassigned propagation velocity, means in one part of said container for transmitting an elastic wave into said mixture, and means in another part of said container for receiving said elastic wave.

11. A temperature-compensated wave delay device which comprises a container, a fluid mixture of at least three components including water, a glycol and methanol within said container, said components being present in said mixture in such proportions as to give a substantially zero temperature coefficient of wave propagation velocity at a preassigned temperature and at a preassigned propagation velocity, means in one part of said container for transmitting an elastic wave into said mixture, and means in another part of said container for receiving said elastic wave.

12. A temperature-compensated wave delay device which comprises a container, a fluid mixture of at least three components including water, a glycol and glycerol within said container, said components being present in said mixture in such proportions as to give a substantially zero temperature coefficient of wave propagation velocity at a preassigned temperature and at a preassigned propagation velocity, means in one part of said container for transmitting an elastic wave into said mixture, and means in another part of said container for receiving said elastic wave.

WALTER L. BOND.
GERALD W. WILLARD.

REFERENCES CITED

The following references are of record in the file of this patent:

UNITED STATES PATENTS

| Number | Name | Date |
|---|---|---|
| 2,263,902 | Percival | Nov. 25, 1941 |
| 1,924,174 | Wolf | Aug. 29, 1933 |
| 2,268,643 | Crosby | Jan. 6, 1942 |
| 2,229,215 | Magruder et al. | Jan. 21, 1941 |
| 2,003,429 | Cox | June 4, 1935 |
| 2,258,184 | Keenoy | Oct. 7, 1941 |
| 1,213,368 | Hibbert | Jan. 23, 1917 |